(12) United States Patent
Albrecht

(10) Patent No.: US 12,175,418 B2
(45) Date of Patent: Dec. 24, 2024

(54) BLOCKCHAIN-BASED MULTI-APPLICATION COMMUNICATION PLATFORM

(71) Applicant: SAP SE, Walldorf (DE)

(72) Inventor: Frank Albrecht, Walldorf (DE)

(73) Assignee: SAP SE, Walldorf (DE)

( * ) Notice: Subject to any disclaimer, the term of this patent is extended or adjusted under 35 U.S.C. 154(b) by 603 days.

(21) Appl. No.: 17/129,575

(22) Filed: Dec. 21, 2020

(65) Prior Publication Data

US 2022/0197730 A1    Jun. 23, 2022

(51) Int. Cl.
| | |
|---|---|
| *G06Q 10/08* | (2024.01) |
| *G06F 16/23* | (2019.01) |
| *G06Q 10/087* | (2023.01) |
| *H04L 9/30* | (2006.01) |
| *H04L 9/32* | (2006.01) |

(52) U.S. Cl.
CPC ....... *G06Q 10/087* (2013.01); *G06F 16/2379* (2019.01); *H04L 9/30* (2013.01); *H04L 9/3268* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 7,130,885 | B2 * | 10/2006 | Chandra | G06Q 10/107 709/224 |
| 2007/0073743 | A1 * | 3/2007 | Bammi | G06Q 10/00 |
| 2007/0294271 | A1 * | 12/2007 | Bammi | G06F 21/552 |
| 2014/0081699 | A1 * | 3/2014 | Bammi | G06F 21/552 705/7.28 |
| 2020/0142739 | A1 * | 5/2020 | Chan | G06F 21/16 |
| 2021/0049717 | A1 * | 2/2021 | Li | H04L 9/50 |
| 2021/0119804 | A1 * | 4/2021 | Ow | G06Q 30/04 |
| 2022/0114150 | A1 * | 4/2022 | Saurabh | H04L 9/3239 |
| 2022/0139137 | A1 * | 5/2022 | Johnson | G07C 9/00857 340/5.25 |
| 2022/0207468 | A1 * | 6/2022 | Lin | G06Q 50/28 |

* cited by examiner

*Primary Examiner* — Fateh M Obaid
(74) *Attorney, Agent, or Firm* — Klarquist Sparkman, LLP

(57) ABSTRACT

Systems, methods, and computer media for blockchain-based communication between applications are provided herein. Using a blockchain-based multi-application communication platform, different applications can create and interact with trusted records. A trusted record represents something quantified and/or tracked through an application. Trusted records are stored in a blockchain. Trusted records can be created by one application and accessed by other applications through the platform. Interactions of the different applications with a trusted record are also stored in the blockchain. The immutability of information stored in the blockchain ensures that the trusted records can in fact be trusted, ensures that interactions with trusted records are memorialized, and removes uncertainty as to which application's records are correct.

20 Claims, 6 Drawing Sheets

SOFTWARE 680 IMPLEMENTING DESCRIBED TECHNOLOGIES

BLOCKCHAIN-BASED MULTI-APPLICATION COMMUNICATION PLATFORM

BACKGROUND

Enterprise software applications are frequently used by entities to manage a variety of entity functions. Different entities can use different enterprise applications or different instances of the same enterprise application.

DETAILED DESCRIPTION

Figure 1:
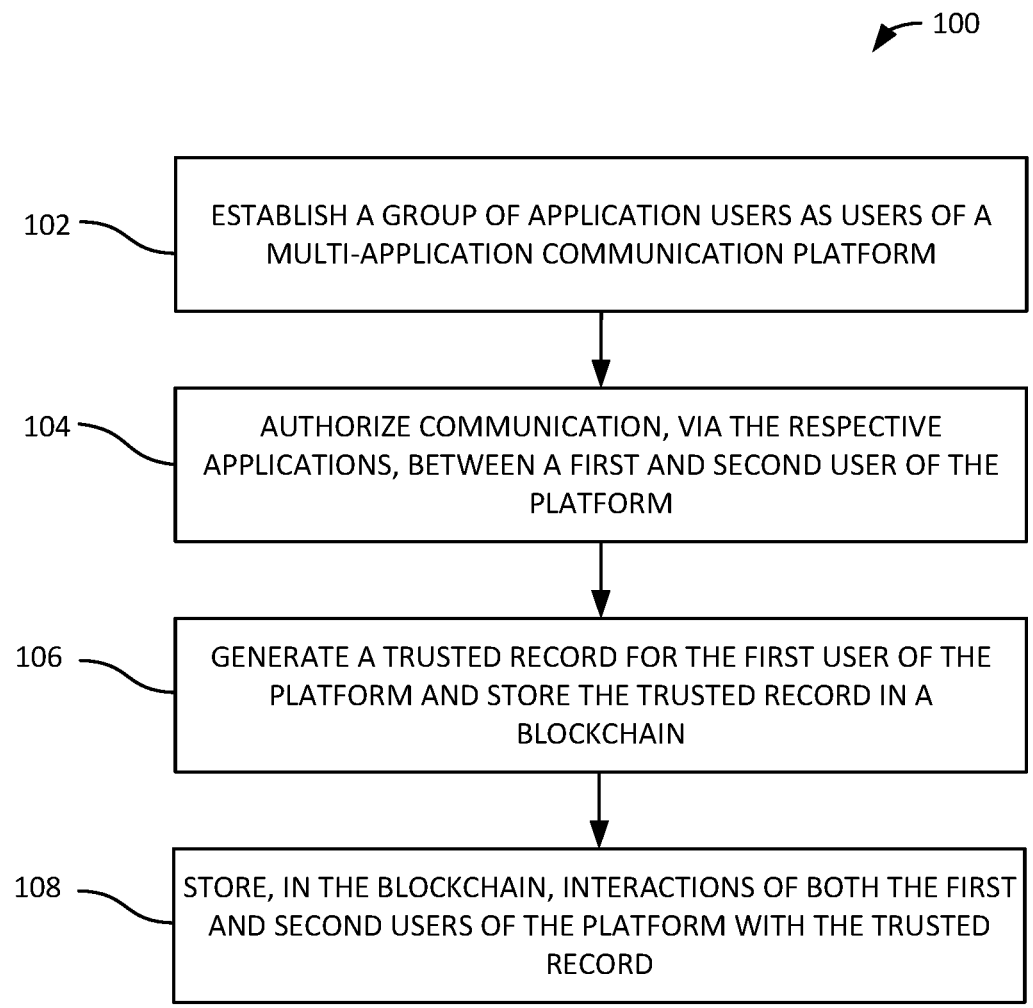
FIG. 1 illustrates an example method of multiple applications interacting with a trusted record through a blockchain-based multi-application communication platform.

The examples described herein generally allow interaction with a trusted record through a blockchain-based multi-application communication platform. Typically, entities (e.g., companies or organizations such as manufacturers, suppliers, retailers, etc.) use enterprise software applications (also referred to herein as simply "applications") to perform various operations, including storing/analyzing data, tracking inventory, designing/implementing processes, tracking/maintaining project or design statuses, etc.

While enterprise applications have introduced various efficiencies and analytical capabilities, communication between applications can be difficult. Even different entities using instances of the same enterprise application typically cannot share information and communicate without manually developing an intermediary application. Further, information shared between applications (e.g., supplier part inventory shared with an original equipment manufacturer (OEM)) can be subject to uncertainties about which application's information is correct or current.

The examples described herein enable communication between applications using a blockchain-based multi-application communication platform. Using the platform, different applications can create and interact with trusted records. A trusted record represents something quantified and/or tracked through an enterprise application. A trusted record can represent, for example, an inventory item, a certificate, a status, a project, a planning document, a design document, an agreement, etc. Trusted records are stored in a blockchain. The immutability of information stored in the blockchain ensures that the trusted records can in fact be trusted, ensures that interactions with trusted records are memorialized, and removes uncertainty as to, for example, which version is current or which number is accurate, whether information has been viewed, etc.

As a specific example, consider a supplier, manufacturer, and certifier that each use different instances of an enterprise application. The supplier application, manufacturer application, and certifier application can register with a multi-application communication platform. The supplier application can initiate creation of a trusted record to represent a part that the supplier provides to the manufacturer. The trusted record is stored in the blockchain, where it is accessible to the supplier application, manufacturer application, and certifier application through the platform. The different applications can interact with the trusted record through an application programming interface (API) associated with the platform.

In many cases, parts provided by a supplier to a manufacturer go through a certification process to ensure compliance with various requirements. In this example, the supplier can request generation of a certificate for the part, and after generation of the certificate, the trusted record can be modified to reflect that a certificate was generated. A notification can be provided to the manufacturer application that a certificate was generated, and the manufacturer application can access the trusted record through the platform to verify. The trusted record can also be modified to reflect that the notification was provided. Because the trusted record is stored in the blockchain, the various interactions with the trusted record are recorded and cannot be changed or deleted, providing the supplier, manufacturer, and certifier with reliable information that can be trusted. Further, the distributed nature of the blockchain eliminates the need for a centralized authority to manage each trusted record. Additional examples are described below with reference to FIGS. 1-6.

FIG. 1 illustrates an example method 100 of multiple applications interacting with a trusted record through a blockchain-based multi-application communication platform. In process block 102, a group of applications are established as users of a multi-application communication platform. The applications can be different enterprise applications associated with different entities (e.g., organizations or companies). As used herein, "different applications" refers to different applications provided by different software companies, different applications provided by the same software company, or different instances of the same application. Enterprise applications can be locally installed applications or cloud applications.

Process block 102 can include assigning unique identifiers to the respective applications. The unique identifiers can be usernames, numerals, or other identifiers. The identifiers can also be uniform reference locators (URLs)—examples of such identifiers are discussed below. The identifiers can be used to address communication between applications. Functionality to establish an application as a user of the platform can be included in the application or can be downloaded/accessed separately, such as through a plugin, application module, or registration website.

In process block 104, communication is authorized between a first and second user of the platform via the respective applications. In some examples, users of the platform (applications) can enable or disable communication with other applications and/or specify applications for which communication is authorized or not authorized. In some examples, one application sends another application a request to authorize communication. Individual applications can also approve or authorize other applications using the other application's unique identifier. Requests to mutually approve/authorize can be sent after one application authorizes. Authorization of communication can be done through one or more platform APIs associated with the respective applications.

In process block 106, a trusted record for the first user of the platform is generated and stored in a blockchain. A trusted record represents something quantified and/or tracked through an enterprise application. A trusted record can represent, for example, an inventory item, a certificate, a status, a project, a planning document, a design document, an agreement, etc. The trusted record can be assigned an identifier. In process block 108, interactions of both the first and second users with the trusted record are stored in the trusted record in the blockchain. Interactions can include updating or modifying information in the trusted record, creation of the trusted record, viewing information or accessing the trusted record, sending/receiving notifications related to the trusted record, etc. The interactions can be accessed by the first and second users of the platform through, for example, specifying the identifier of the trusted record using a platform API associated with the respective applications.

Figure 2:
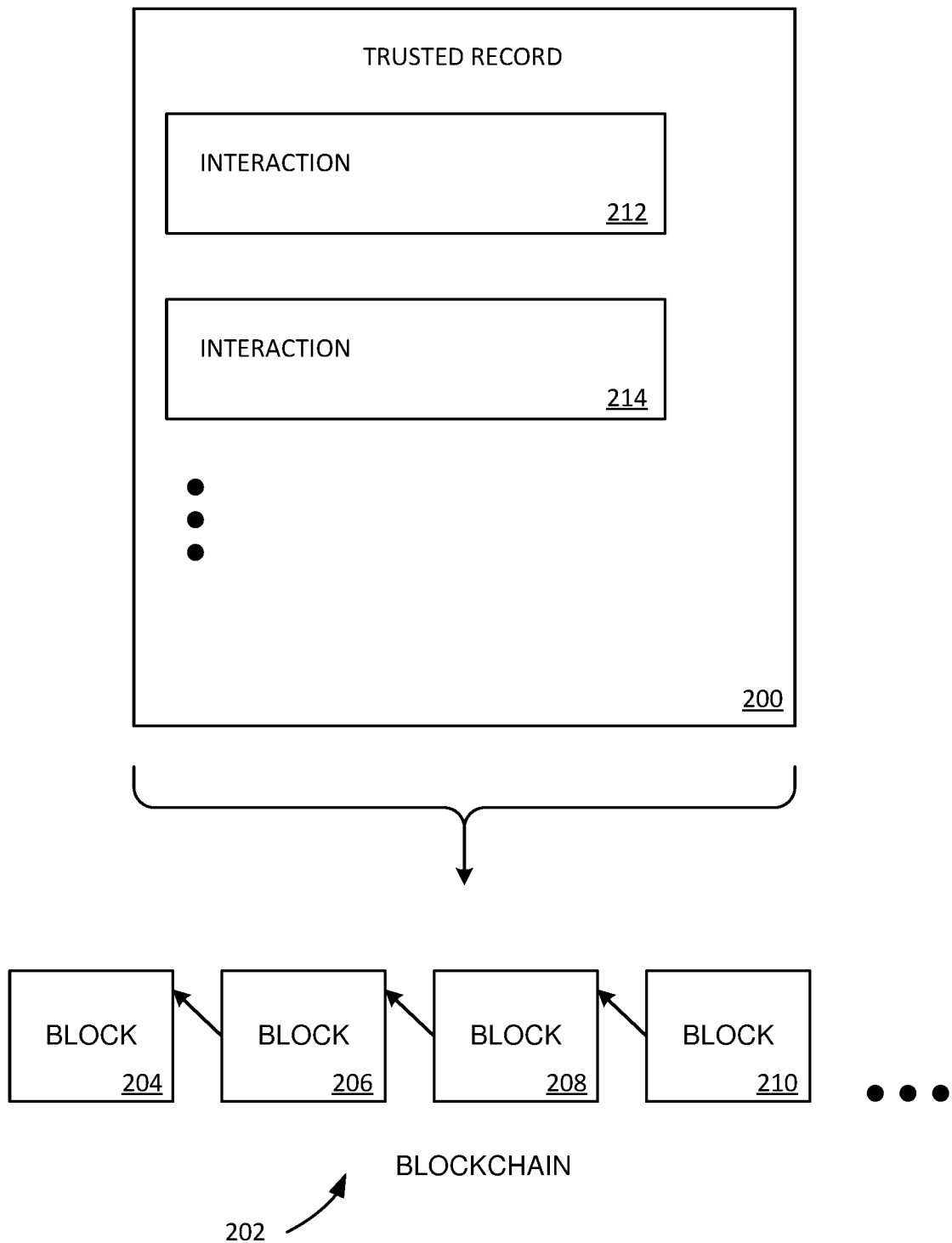
FIG. 2 is an example trusted record stored in a blockchain.

FIG. 2 illustrates an example trusted record 200 stored in a blockchain 202. As used herein, "blockchain" refers to a distributed storage platform and network in which individual "blocks" are connected in a chain. Blocks are stored on nodes, which can be various distributed computing devices. Each block is linked to the previous block in the blockchain by, for example, including a hash of the previous block. Various hash functions, including functions in the Secure Hash Algorithm (SHA)-1 or -2 families, such as SHA-256, can be used to perform a one-way hash. For a one-way hash, it is generally considered to be impossible or impractical to generate the input (the "message") to the hash function based on the output (the "message digest" or "digest") of the hash function. In FIG. 2, blocks 204, 206, 208, and 210 form blockchain 202 that stores trusted record 200.

Trusted record 200 includes interactions 212 and 214. Interactions 212 and 214 can include an interaction type (e.g., "create record," "view record," "update record," etc.) along with a timestamp and an identifier for the interacting application. In some examples, public keys (e.g., for use with a blockchain wallet) are assigned to the respective applications, and the public key of the interacting application is stored in interactions 212 and 214 in trusted record 200. Another example trusted record is illustrated below in Table 2. Blockchain 202 can be implemented using a number of blockchain frameworks, including MultiChain, which is a platform used to establish private blockchains that has an API and a command line interface. Other blockchain frameworks include Hyperledger Fabric, which is a modular blockchain framework that acts as a foundation for developing blockchain-based products, solutions, and applications, and Quorum, which enables enterprises to leverage Ethereum for blockchain applications.

Figure 3:
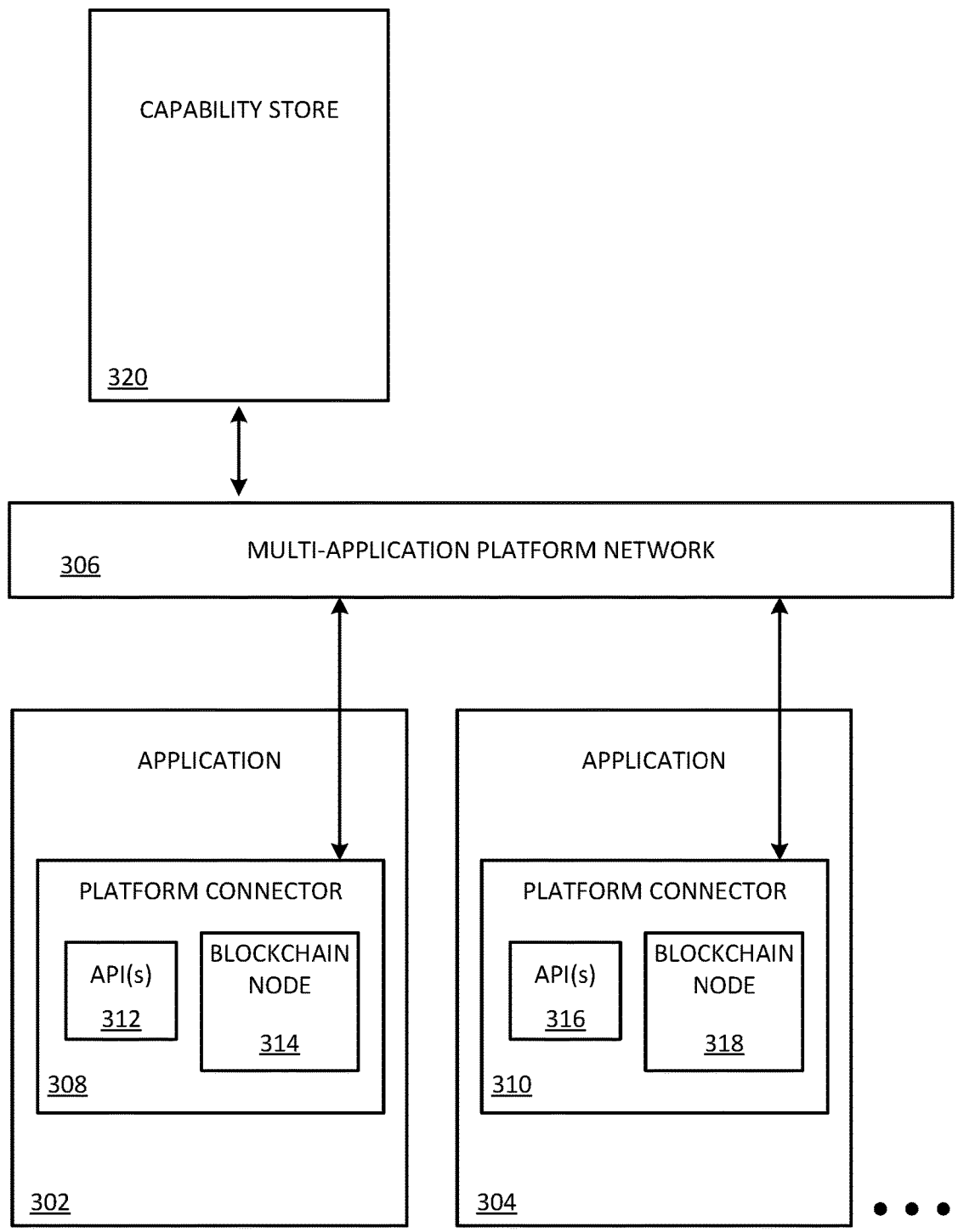
FIG. 3 is an example blockchain-based multi-application communication platform.

FIG. 3 illustrates an example blockchain-based multi-application communication platform environment 300. Applications 302 and 304 are users in the platform. Applications 302 and 304 are associated with different entities (e.g. two different companies or organizations) and engage with the platform through multi-application platform network 306 and platform connectors 308 and 310. Platform connectors 308 and 310 include APIs 312 and 316 as well as blockchain nodes 314 and 318. Platform connectors 308 and 310 can be built-in to applications 302 and 304 or added as plugins or modules. In some examples, platform connectors 308 and 310 are provided as a service accessible through applications 302 and 304. Platform network 306 can include a blockchain network that implements the blockchain, of which blockchain nodes 314 and 318 are a part. Each blockchain node in the network contains the same transactions and blocks. Platform network 306 can also include event routing logic, public key generation capabilities, identifier generation capabilities, etc.

APIs 312 and 316 can be representational state transfer (REST) APIs that communicate between applications using hypertext transfer protocol (HTTP). The APIs include multiple endpoints for accomplishing particular actions. HTTP endpoints include a "method" (sometimes referred to as a verb) such as GET, POST, DELETE, PUT, or PATCH, along with a "path" (e.g., a uniform resource locator (URL) for a website), and in some cases one or more "parameters" that are passed in the URL as key/value pairs, for example. Examples of other API endpoint types include simple object access protocol (SOAP), extensible markup language—remote procedure call (XML-RPC) protocol, and others. Table 1, below, shows example API endpoints for an example Trusted Record API, along with a functional description.

TABLE 1

Example Trusted Record API Endpoints

Trusted Record Type

GET /RecordTypes - (get all record types)
POST /RecordTypes - (add a new record type)
GET /RecordTypes/{RecordType} - (get a record type)
DELETE /RecordTypes/{RecordType} - (delete a record type)

Trusted Record Write

POST /RecordTypes/{RecordType}/instances - (create a new trusted record instance and get the instance identifier)
POST /RecordTypes/{RecordType}/interactions/{RecordID} - (add a new interaction to a trusted record)

Trusted Record Read

GET /RecordTypes/{RecordType}/instances - (get all trusted record instances)
GET /RecordTypes/{RecordType}/instances/{RecordID} - (get a specific trusted record)
GET /RecordTypes/{RecordType}/interactions/{RecordID} - (get all interactions for the specific trusted record)

Platform environment 300 also includes capability store 320. Capability store 320 is a directory for capabilities (which include a description of the capability, API definition, etc.) that are available to the respective applications that are users of the platform to access and implement. Capabilities can include a wide range of functionality. Users of the platform can create and define capabilities and publish the capabilities to the store for use by other users. Capability store 320 can be implemented, for example, as a software-as-a-service application. Other functions or features can also be implemented as a software-as-a-service application in communication with multi-application platform network 306. Creation of trusted records can be a capability included in capability store 320.

Multi-application platform network 306, in conjunction with platform connectors 308 and 310, can also perform various eventing functions. For example, application 302 can subscribe to events for a trusted record created by application 304. Each time an interaction (or a particular type of interaction, such as a modification or view) with the trusted record is recorded in the blockchain (i.e., an event occurs), a notification can be provided to application 302. The fact that a notification was sent can also be stored in the blockchain. In some examples, a separate API is used for event management.

Users in platform environment 300 (e.g., applications 302 and 304) can be assigned identifiers that are HTTP URLs (for example, "user86.platform.com," "user97.platform.com," etc.). This URL can be incorporated in the API endpoint to access particular trusted records. For example, to read a trusted record representing inventory item 4711 associated with user86.platform.com, the following endpoint can be used: "GET/user86.platform.com/InventoryItem/4711." Other identifiers are also possible.

Figure 4:
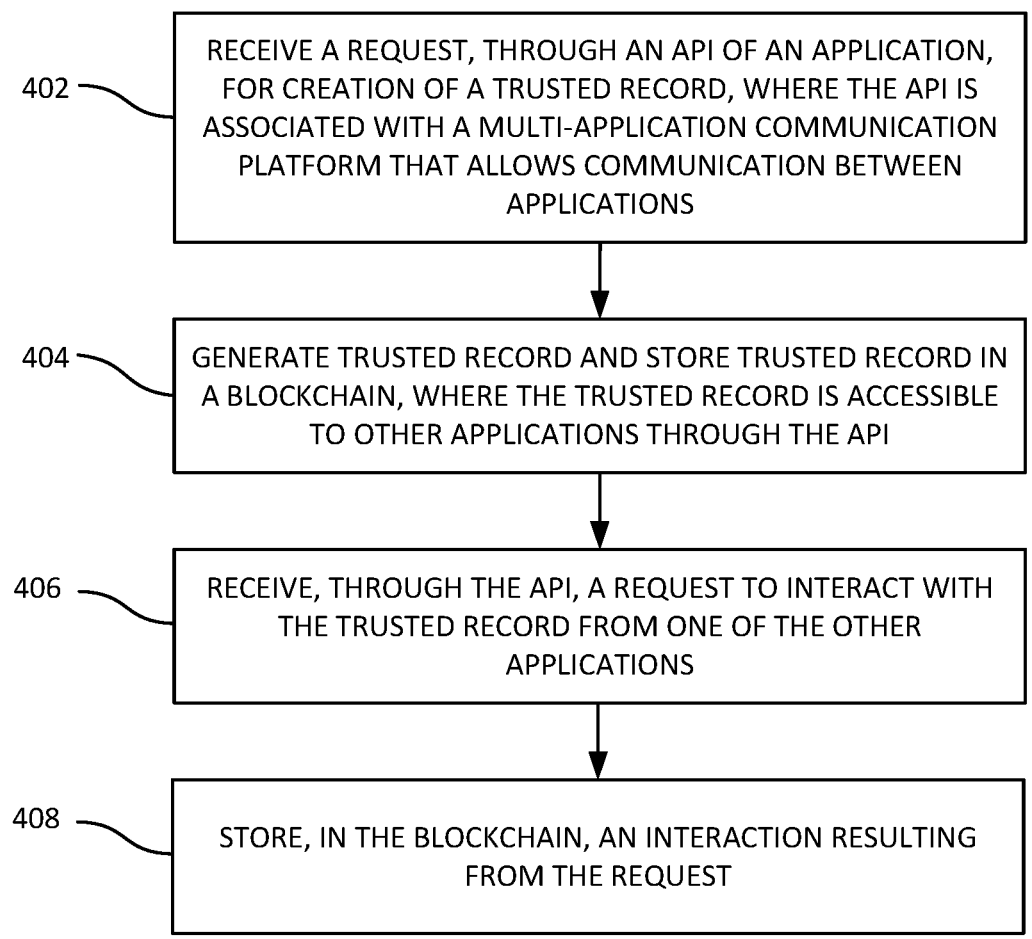
FIG. 4 illustrates an example method of multiple applications interacting with a trusted record through an API associated with a blockchain-based multi-application communication platform.

FIG. 4 illustrates a method 400 of multiple applications interacting with a trusted record through an API associated with a blockchain-based multi-application communication platform. In process block 402, a request is received, through an API of an application, for creation of a trusted record. The API is associated with a multi-application communication platform that allows communication between applications. For example, the API endpoint "POST/RecordTypes/{RecordType}/instances," shown in Table 1, can be used. Reference is made to Table 1 for convenience—various other APIs and API endpoints are also possible.

In process block 404, the trusted record is generated and stored in a blockchain. An identifier can also be generated for the trusted record. The trusted record is accessible to other applications through the API (e.g., using the various API endpoints shown in Table 1). In process block 406, a request to interact with the trusted record is received through the API from one of the other applications. For example, the endpoint "GET/RecordTypes/{RecordType}/instances/{RecordID}" can be used to read a trusted record with the identifier "RecordID."

In process block 408, an interaction resulting from the request is stored in the blockchain. Table 2 below illustrates some example interactions, stored in the blockchain, for a certificate creation scenario in which a supplier creates a trusted record for a part, a certifier assigns a certificate for the part, an OEM is notified that the certificate is assigned, and the OEM confirms the notification. In some examples, the certificate is also stored in the blockchain in the trusted record.

TABLE 2

Example Trusted Record Interactions Stored in Blockchain

| Interaction | TimeStamp | Public Key | Trusted Record | Interaction Type |
|---|---|---|---|---|
| 1 | 2020 Nov. 12 12:03:17 | dd8bd90e-7660-4339-a6f3-75aa46dae30c (Supplier) | 4281fcb5-ed1d-4ad6-93ac-3b85b8c3ad52 | Create Record |
| 2 | 2020 Nov. 12 12:03:21 | 18a07b8e-c6a6-40b8-8485-65bff8d721f7 (Certifier) | 4281fcb5-ed1d-4ad6-93ac-3b85b8c3ad52 | Assign New Certificate |
| 3 | 2020 Nov. 12 12:03:23 | dd8bd90e-7660-4339-a6f3-75aa46dae30c (Supplier) | 4281fcb5-ed1d-4ad6-93ac-3b85b8c3ad52 | Notify OEM |
| 4 | 2020 Nov. 12 12:03:27 | 309e2da2-ca6d-4317-ad14-37ddb4be45c6 (OEM) | 4281fcb5-ed1d-4ad6-93ac-3b85b8c3ad52 | Confirm Notification |

As can be seen in Table 2, for each interaction, a time stamp, the public key of the interacting party, the trusted record identifier, and the interaction type are stored. The trusted record includes all of the interactions including the trusted record identifier and can also include data such, as an inventory number, or documentation such as a version of a design or agreement or certificate.

Figure 5:
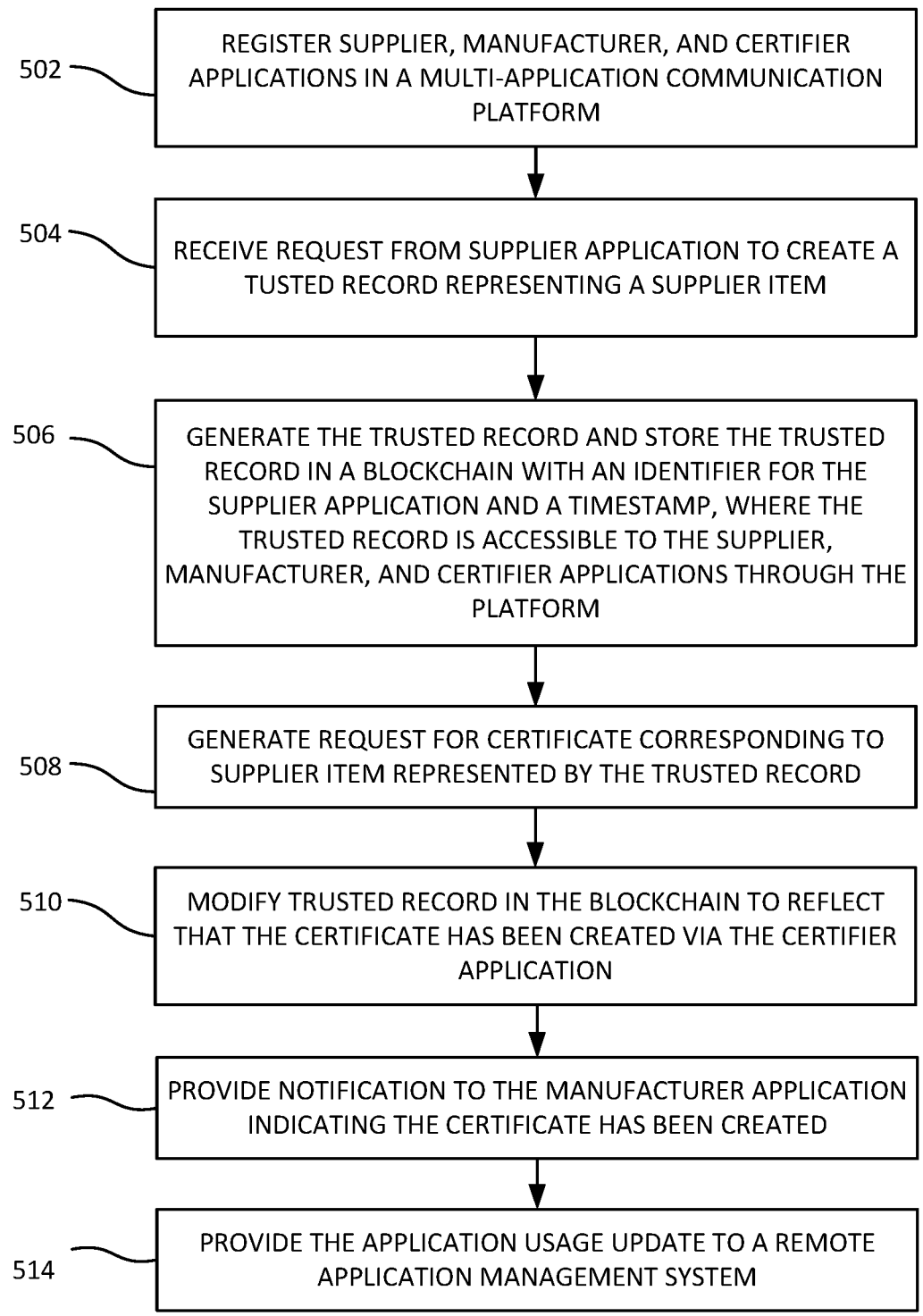
FIG. 5 illustrates an example method in which a first application, second application, and certifier application interact with a trusted record through a blockchain-based multi-application communication platform.

FIG. 5 illustrates an example method 500 in which a certifier application and two other applications interact with a trusted record through a blockchain-based multi-application communication platform. In process block 502, a first application, a second application, and a certifier application are registered in a multi-application communication platform that allows communication between the respective applications. Process block 502 can include assigning an identifier (such as an HTTP-based identifier) to the respective applications for communicating through the platform.

In process block 504, a request is received from the first application to create a trusted record representing an item. The first application can be a supplier application, and the item can be an inventory item of the supplier. The second application can be a manufacturer application of a manufacturer who uses the inventory item in a larger system.

In process block 506, the trusted record is generated and stored in a blockchain, along with an identifier for the first application and a timestamp. The trusted record is accessible to the first application, second application, and certifier applications through the multi-application communication platform (e.g., through an API such as the API endpoints shown in Table 1). In process block 508, a request for a certificate corresponding to the item represented by the trusted record is generated. Certificates can be required for certain things, such as car parts supplied to an automobile manufacturer. In process block 510, the trusted record is modified in the blockchain to reflect that the certificate has been created via the certifier application. (See, for example, interaction 2 in Table 2.)

A notification is provided to the second application in process block 512 indicating that the certificate has been created. The trusted record in the blockchain is modified to reflect that the second application was notified of the certificate creation.

Example Computing Systems

Figure 6:
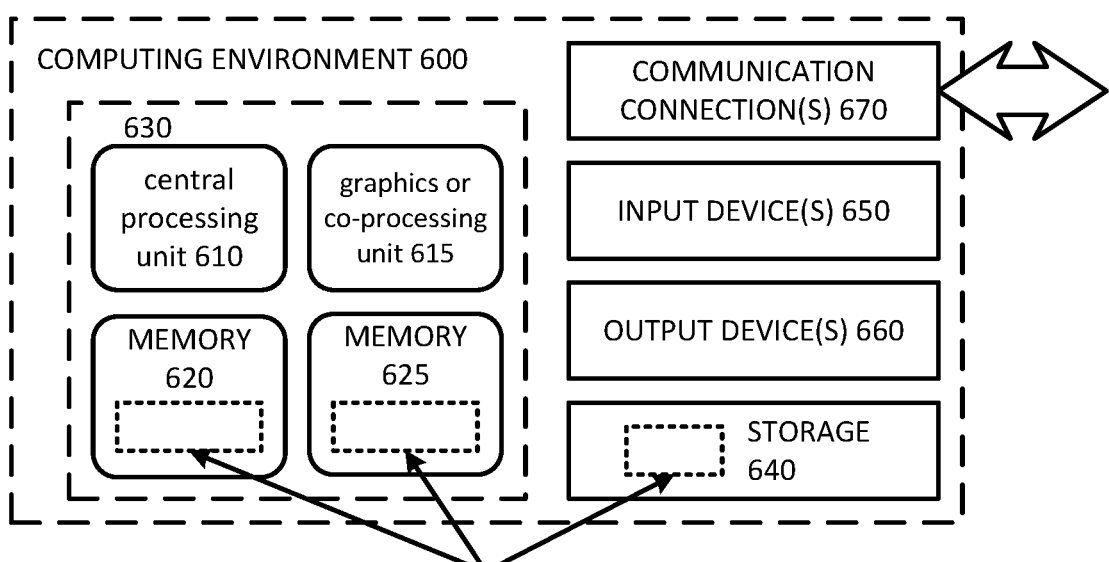
FIG. 6 is a diagram illustrating a generalized implementation environment in which some described examples can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, memory 620 and 625 can store platform connectors 308 or 310 of FIG. 3.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein. For example, storage 640 can store platform connectors 308 or 310 of FIG. 3.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

I claim:

1. A method, comprising:
   registering a group of enterprise applications as application-users of a multi-application communication platform that allows communication between the respective enterprise applications;
   generating a first identifier for a first application-user of the platform, the first identifier adapted for communicating through the platform;
   generating a second identifier for a second application-user of the platform, the second identifier adapted for communication through the platform;
   authorizing communication, between a first application-user and a second application-user of the platform using the first identifier for the first application-user and the second identifier for the second application-user;
   generating a trusted record for the first application-user of the platform and storing the trusted record in a blockchain; and
   storing, in the blockchain, interactions of both the first application-user and second application-user of the platform with the trusted record, wherein the stored interactions comprise an interaction type, a timestamp, and an application identifier.

2. The method of claim 1, wherein the interactions are initiated through a multi-application communication platform application programming interface (API) of the first application-user and the second application-user.

3. The method of claim 1, wherein the trusted record represents one of an inventory item, a certificate, a planning document, a design document, or an agreement.

4. The method of claim 1, further comprising accessing the interactions stored in the blockchain through a multi-application communication platform application programming interface (API) of the first application-user and the second application-user.

5. The method of claim 1, wherein the first application-user and the second application-user have an associated blockchain node of the blockchain.

6. The method of claim 1, further comprising:
   subscribing the second application-user to events related to the trusted record; and
   upon determining that a new interaction with the trusted record has occurred, providing a notification to the second application-user.

7. The method of claim 6, wherein the trusted record represents an inventory item, and wherein the first application-user is a supplier of the inventory item.

8. The method of claim 1, further comprising, for the first application-user and the second application-user, generating a public key for accessing the trusted record stored in the blockchain, and wherein for the respective interactions with the trusted record, the public key of the first application-user and the public key of the second application-user are stored, along with the timestamp and the interaction type, in the blockchain.

9. A system, comprising:
   at least one processor; and
   one or more computer-readable storage media storing computer-readable instructions that, when executed by the at least one processor, perform operations comprising:
   establishing a group of enterprise applications as application-users of a multi-application communication platform that allows communication between the respective enterprise applications, wherein the enterprise applications comprise different enterprise software applications or different instances of a same enterprise software application;
   authorizing communication, via respective applications, between a first and second application-user of the platform;
   generating a trusted record for the first application-user of the platform and storing the trusted record in a blockchain; and
   storing, in the blockchain, interactions of both the first and second application-users of the platform with the trusted record.

10. The system of claim 9, wherein the interactions are initiated through the respective enterprise applications of the first and second application-users.

11. The system of claim 10, wherein the interactions are initiated through a multi-application communication platform application programming interface (API) of the respective applications.

12. The system of claim 9, wherein the trusted record represents one of an inventory item, a certificate, a planning document, a design document, or an agreement.

13. The system of claim 9, further comprising accessing the interactions stored in the blockchain through a multi-application communication platform application programming interface (API) of the respective enterprise applications.

14. The system of claim 9, wherein the respective enterprise applications have an associated blockchain node of the blockchain.

15. The system of claim 9, further comprising:
   subscribing the second application-user to events related to the trusted record; and
   upon determining that a new interaction with the trusted record has occurred, providing a notification to the second application-user.

16. The system of claim 15, wherein the trusted record represents an inventory item, and wherein the first application-user is a supplier of the inventory item.

17. The system of claim 9, further comprising generating an identifier for respective application-users of the multi-application communication platform, wherein the identifier is used in authorizing communication between the first and second application-users of the platform.

18. One or more non-transitory computer-readable storage media storing computer-executable instructions for performing a method, the method comprising:
   establishing a group of enterprise applications as users of a multi-application communication platform by assigning identifiers to the respective enterprise applications for communicating through the platform, wherein the enterprise applications comprise different enterprise software applications or different instances of a same enterprise software application;

authorizing communication, via respective enterprise applications, between a first and second user of the platform using an identifier for the first user and an identifier for the second user;

generating a trusted record for the first user of the platform and storing the trusted record in a blockchain, wherein the identifiers are incorporated in a trusted record application programming interface endpoint of a trusted record application programming interface to access the trusted record; and storing, in the blockchain, interactions of both the first and second users of the platform with the trusted record, wherein the stored interactions comprise an interaction type, a timestamp, and an application identifier;

wherein the trusted record application programming interface comprises:

a plurality of trusted record type endpoints;

a plurality of trusted record write endpoints; and a plurality of trusted record read endpoints.

19. The method of claim 1, wherein the generating and the storing are performed on the blockchain with a trusted record application programming interface, and the trusted record application programming interface comprises:

a plurality of trusted record type endpoints;

a plurality of trusted record write endpoints; and a plurality of trusted record read endpoints.

20. The method of claim 19, wherein:

the first identifier for the first application-user of the platform comprises a uniform resource locator; and the uniform resource locator is incorporated into a call to the trusted record application programming interface for performing the generating or storing.

* * * * *